United States Patent
Naguib et al.

(10) Patent No.: US 8,831,594 B2
(45) Date of Patent: Sep. 9, 2014

(54) POST-DEPLOYMENT CALIBRATION OF WIRELESS BASE STATIONS FOR WIRELESS POSITION DETERMINATION

(71) Applicant: QUALCOMM Incorporated, San Diego, CA (US)

(72) Inventors: Ayman Fawzy Naguib, Cupertino, CA (US); Alok Aggarwal, Foster City, CA (US); Jin Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/671,367

(22) Filed: Nov. 7, 2012

(65) Prior Publication Data

US 2013/0072228 A1   Mar. 21, 2013

Related U.S. Application Data

(63) Continuation of application No. 12/643,676, filed on Dec. 21, 2009.

(60) Provisional application No. 61/139,928, filed on Dec. 22, 2008.

(51) Int. Cl.
*H04W 24/00* (2009.01)
*H04B 17/00* (2006.01)
*G01S 5/02* (2010.01)
*H04W 24/04* (2009.01)

(52) U.S. Cl.
CPC ............. *H04W 24/04* (2013.01); *G01S 5/0242* (2013.01); *G01S 5/021* (2013.01)
USPC ...... 455/424; 455/67.11; 455/423; 455/456.5

(58) Field of Classification Search
USPC ................ 455/67.11, 423, 424, 456.1, 456.5, 455/456.6
See application file for complete search history.

(56) References Cited

U.S. PATENT DOCUMENTS 6,477,380 B1  11/2002  Uehara et al.
6,665,333 B2  12/2003  McCrady et al.
(Continued)

FOREIGN PATENT DOCUMENTS

CN  1269947 A  10/2000
CN  1444833 A  9/2003
(Continued)

OTHER PUBLICATIONS

Andre Gunther, et al., "Measuring Round Trip Times to Determine the Distance between WLAN Nodes", Proceedings of Networking 2005, May 6, 2005, pp. 1-12, XP002655207, Waterloo, Canada pp. 1-6.

(Continued)

*Primary Examiner* — Dwayne Bost
*Assistant Examiner* — Larry Sternbane

(57) ABSTRACT

Methods and apparatuses are directed to calibrating a misconfigured wireless access point. One method may include receiving a position of mobile station(s) and wireless signal model measurements derived from packets exchanged between the mobile station(s) and a plurality of wireless access points, receiving positions and/or identities of the plurality of wireless access points used in determining the position of the mobile station(s), comparing a position of the mobile station(s) with wireless signal model measurements, and identifying a misconfigured wireless access point based upon the comparing. Another method may include receiving positions associated with a plurality of wireless access points, determining a position of a mobile station based upon a wireless signal model, comparing the position of the mobile station and the wireless signal model with the positions associated with the plurality of wireless access points, and determining whether at least one wireless access point is misconfigured.

32 Claims, 7 Drawing Sheets

(56) References Cited

U.S. PATENT DOCUMENTS

| | | |
|---|---|---|
| 6,681,099 B1 | 1/2004 | Keranen et al. |
| 6,754,488 B1 | 6/2004 | Won et al. |
| 7,006,834 B2 | 2/2006 | Gaal et al. |
| 7,079,851 B2 | 7/2006 | Makuta |
| 7,130,646 B2 | 10/2006 | Wang |
| 7,138,946 B2 | 11/2006 | Tamaki et al. |
| 7,346,120 B2 | 3/2008 | McCorkle |
| 7,383,049 B2 | 6/2008 | Deloach, Jr. et al. |
| 7,469,139 B2 | 12/2008 | van de Groenendaal |
| 7,525,484 B2 | 4/2009 | Dupray et al. |
| 7,574,216 B2 | 8/2009 | Leitch et al. |
| 7,672,283 B1 | 3/2010 | Chang et al. |
| 7,676,218 B2 | 3/2010 | Ballai |
| 7,716,740 B2 | 5/2010 | Robert et al. |
| 7,751,829 B2 | 7/2010 | Masuoka et al. |
| 7,756,615 B2 | 7/2010 | Barfoot et al. |
| 7,810,154 B2 | 10/2010 | Hum et al. |
| 7,893,873 B2 | 2/2011 | Black et al. |
| 7,899,006 B2 | 3/2011 | Boyd |
| 7,983,622 B1 | 7/2011 | Vaughan |
| 8,165,150 B2 | 4/2012 | Aweya et al. |
| 8,238,942 B2 | 8/2012 | Gast |
| 8,244,272 B2 | 8/2012 | Morgan et al. |
| 2001/0053699 A1 | 12/2001 | McCrady et al. |
| 2002/0173295 A1 | 11/2002 | Nykanen et al. |
| 2003/0125046 A1 | 7/2003 | Riley et al. |
| 2003/0129995 A1 | 7/2003 | Niwa et al. |
| 2003/0182053 A1 | 9/2003 | Swope et al. |
| 2004/0003285 A1 | 1/2004 | Whelan et al. |
| 2004/0023640 A1 | 2/2004 | Ballai |
| 2004/0104842 A1 | 6/2004 | Drury et al. |
| 2004/0189712 A1 | 9/2004 | Rundell |
| 2004/0203539 A1 | 10/2004 | Benes et al. |
| 2004/0203931 A1 | 10/2004 | Karaoguz |
| 2004/0223599 A1 | 11/2004 | Bear et al. |
| 2004/0235499 A1 | 11/2004 | Tanaka et al. |
| 2004/0258012 A1 | 12/2004 | Ishii |
| 2005/0055412 A1 | 3/2005 | Kaminsky et al. |
| 2005/0058081 A1 | 3/2005 | Elliott |
| 2005/0130669 A1 | 6/2005 | Mizugaki et al. |
| 2005/0130699 A1 | 6/2005 | Kim et al. |
| 2005/0201533 A1 | 9/2005 | Emam et al. |
| 2005/0208900 A1 | 9/2005 | Karacaoglu |
| 2006/0004911 A1 | 1/2006 | Becker et al. |
| 2006/0009235 A1* | 1/2006 | Sheynblat et al. ......... 455/456.1 |
| 2006/0085581 A1 | 4/2006 | Martin |
| 2006/0090169 A1 | 4/2006 | Daniels et al. |
| 2006/0120334 A1 | 6/2006 | Wang et al. |
| 2006/0189329 A1 | 8/2006 | Anderson |
| 2006/0195252 A1 | 8/2006 | Orr et al. |
| 2006/0200862 A1 | 9/2006 | Olson et al. |
| 2006/0256838 A1 | 11/2006 | Yarkosky |
| 2007/0002813 A1 | 1/2007 | Tenny et al. |
| 2007/0078905 A1 | 4/2007 | Gunther et al. |
| 2007/0099646 A1 | 5/2007 | Tanaka et al. |
| 2007/0115842 A1 | 5/2007 | Matsuda et al. |
| 2007/0121560 A1 | 5/2007 | Edge |
| 2007/0135134 A1 | 6/2007 | Patrick |
| 2007/0136686 A1 | 6/2007 | Price et al. |
| 2007/0265020 A1 | 11/2007 | Cuffaro |
| 2007/0285306 A1 | 12/2007 | Julian et al. |
| 2008/0002820 A1 | 1/2008 | Shtiegman et al. |
| 2008/0034435 A1 | 2/2008 | Grabarnik et al. |
| 2008/0068257 A1 | 3/2008 | Mizuochi |
| 2008/0069318 A1 | 3/2008 | McClung |
| 2008/0097966 A1 | 4/2008 | Choi et al. |
| 2008/0101227 A1 | 5/2008 | Fujita et al. |
| 2008/0101277 A1 | 5/2008 | Taylor et al. |
| 2008/0180315 A1 | 7/2008 | Tarlow et al. |
| 2008/0198811 A1 | 8/2008 | Deshpande et al. |
| 2008/0232297 A1 | 9/2008 | Mizugaki et al. |
| 2008/0250498 A1 | 10/2008 | Butti et al. |
| 2008/0287056 A1 | 11/2008 | van de Groenendaal |
| 2008/0287139 A1 | 11/2008 | Carlson et al. |
| 2008/0299993 A1* | 12/2008 | Gordon et al. ............. 455/456.5 |
| 2008/0301262 A1 | 12/2008 | Kinoshita et al. |
| 2009/0011713 A1 | 1/2009 | Abusubaih et al. |
| 2009/0135797 A1 | 5/2009 | Zhang et al. |
| 2009/0257426 A1 | 10/2009 | Hart et al. |
| 2009/0286549 A1 | 11/2009 | Canon et al. |
| 2010/0020776 A1 | 1/2010 | Youssef et al. |
| 2010/0067393 A1 | 3/2010 | Sakimura et al. |
| 2010/0081451 A1* | 4/2010 | Mueck et al. ............... 455/456.1 |
| 2010/0128617 A1 | 5/2010 | Aggarwal et al. |
| 2010/0128637 A1 | 5/2010 | Aggarwal et al. |
| 2010/0130229 A1 | 5/2010 | Sridhara et al. |
| 2010/0130230 A1 | 5/2010 | Aggarwal et al. |
| 2010/0135178 A1 | 6/2010 | Aggarwal et al. |
| 2010/0141515 A1 | 6/2010 | Doucet et al. |
| 2010/0157848 A1 | 6/2010 | Das et al. |
| 2010/0159958 A1 | 6/2010 | Naguib et al. |
| 2010/0172259 A1 | 7/2010 | Aggarwal et al. |
| 2011/0092226 A1 | 4/2011 | Maher et al. |
| 2011/0173674 A1 | 7/2011 | Thomson et al. |
| 2011/0217987 A1 | 9/2011 | Van De Groenendaal |
| 2011/0269478 A1 | 11/2011 | Das et al. |
| 2013/0072227 A1 | 3/2013 | Morgan et al. |
| 2013/0143497 A1 | 6/2013 | Das et al. |
| 2013/0223261 A1 | 8/2013 | Aggarwal et al. |
| 2013/0237246 A1 | 9/2013 | Aggarwal et al. |
| 2014/0018065 A1 | 1/2014 | Naguib et al. |

FOREIGN PATENT DOCUMENTS

| | | |
|---|---|---|
| CN | 1509561 A | 6/2004 |
| CN | 1783810 A | 6/2006 |
| CN | 1914939 A | 2/2007 |
| CN | 101000369 A | 7/2007 |
| CN | 101023632 A | 8/2007 |
| CN | 101082665 A | 12/2007 |
| EP | 1050977 A2 | 11/2000 |
| EP | 1180696 A2 | 2/2002 |
| EP | 1253404 A2 | 10/2002 |
| EP | 1253437 A2 | 10/2002 |
| EP | 1398913 A2 | 3/2004 |
| EP | 1641183 | 3/2006 |
| EP | 1691170 | 8/2006 |
| EP | 1808708 A2 | 7/2007 |
| EP | 1862811 A2 | 12/2007 |
| EP | 1879370 A1 | 1/2008 |
| EP | 1992964 A2 | 11/2008 |
| EP | 2073562 A1 | 6/2009 |
| JP | 50052993 A | 5/1975 |
| JP | 59046568 A | 3/1984 |
| JP | 8146110 A | 6/1996 |
| JP | 8211141 A | 8/1996 |
| JP | 11313359 A | 11/1999 |
| JP | 11326484 A | 11/1999 |
| JP | 2001007764 A | 1/2001 |
| JP | 2001147262 A | 5/2001 |
| JP | 2001268622 A | 9/2001 |
| JP | 2002040121 A | 2/2002 |
| JP | 2002098747 A | 4/2002 |
| JP | 2002159041 A | 5/2002 |
| JP | 2003510614 A | 3/2003 |
| JP | 2003174665 A | 6/2003 |
| JP | 2003204572 A | 7/2003 |
| JP | 2003279648 A | 10/2003 |
| JP | 2004258009 A | 9/2004 |
| JP | 2004350088 A | 12/2004 |
| JP | 2005140617 A | 6/2005 |
| JP | 2005520139 A | 7/2005 |
| JP | 2005345200 A | 12/2005 |
| JP | 2006013894 A | 1/2006 |
| JP | 2006507500 A | 3/2006 |
| JP | 2006148457 A | 6/2006 |
| JP | 2006170891 A | 6/2006 |
| JP | 2006311475 A | 11/2006 |
| JP | 2007500491 A | 1/2007 |
| JP | 2007089006 A | 4/2007 |
| JP | 2007127584 A | 5/2007 |
| JP | 2007212420 A | 8/2007 |
| JP | 2007526445 A | 9/2007 |
| JP | 2007529943 A | 10/2007 |

(56) References Cited

FOREIGN PATENT DOCUMENTS

| | | |
|---|---|---|
| JP | 2008026138 A | 2/2008 |
| JP | 2008029003 A | 2/2008 |
| JP | 2008039738 A | 2/2008 |
| JP | 2008104029 A | 5/2008 |
| JP | 2008122132 A | 5/2008 |
| JP | 2008128728 A | 6/2008 |
| JP | 2008522181 A | 6/2008 |
| JP | 2008527769 A | 7/2008 |
| JP | 2008533436 A | 8/2008 |
| JP | 2008224657 A | 9/2008 |
| JP | 2008233066 A | 10/2008 |
| JP | 2008236516 A | 10/2008 |
| JP | 2009074974 A | 4/2009 |
| JP | 2009150872 A | 7/2009 |
| JP | 2009253494 A | 10/2009 |
| JP | 2010019597 A | 1/2010 |
| TW | I240085 B | 9/2005 |
| TW | I250303 B | 3/2006 |
| TW | 200618539 | 6/2006 |
| TW | 200718972 | 5/2007 |
| TW | 1292829 B | 1/2008 |
| TW | 200816840 A | 4/2008 |
| TW | 1300852 B | 9/2008 |
| WO | 9913662 | 3/1999 |
| WO | 0120260 A1 | 3/2001 |
| WO | 0123904 A2 | 4/2001 |
| WO | 2007021292 A2 | 2/2007 |
| WO | 2007056738 A2 | 5/2007 |
| WO | WO-2008012188 A1 | 1/2008 |
| WO | 2008057737 A2 | 5/2008 |
| WO | WO-2008051124 A1 | 5/2008 |
| WO | 2008066927 | 6/2008 |
| WO | WO-2008085440 A2 | 7/2008 |
| WO | 2008121878 A1 | 10/2008 |
| WO | 2008140880 A1 | 11/2008 |

OTHER PUBLICATIONS

Awad A., et al., "Adaptive Distance Estimation and Localization in WSN Using RSSI Measures" 10th Euromicro Conference on Gidital System Design Architectures, Methods and Tools (DSD 2007) Los Alamitos, CA IEEE Computer Soc., Piscataway, NJ, US Aug. 29, 2007 pp. 471-478.

Blumenthal J, et al., "Precise Positioning with a Low Complexity Algorithm in Ad hoc Wireless Sensor Networks" PIK. Praxis Der Informationsverarbeitung Und Kommunikation, Saur, Muenchen, DE LNKD-DOI:10.1515/PIK0.2005.80, [Online] vol. 28, No. 2, Jun. 1, 2005, pp. 80-85, XP002495976.

Gerasenko S., et al., "Beacon Signals: What, Why, How, and Where", IEEE Computer Society, Computer, vol. 34, No. 10, pp. 108-110, Oct. 2001, doi:10.1109/2.955103.

Golden Stuart A. et al., "Sensor Measurements for WI-FI Location with Emphasis on Time-of-Arrival Ranging," IEEE Transactions on Mobile Computing, vol. 6 (10), 2007.

International Search Report & Written Opinion—PCT/US09/069167—International Search Authority—European Patent Office—May 19, 2010.

Israel Martin-Escalona, et al., "Impact of geometry on the accuracy of the passive-TDOA algorithm" Personal, Indoor and Mobile Radio Communications, 2008. PIMRC 2008. IEEE 19th International Symposium on, IEEE, Piscataway, NO, USA, Sep. 15, 2008, pp. 1-6, XP031371602 ISBN: 978-1-4244-2643-0 abstract I I . Passive-TDOA Positioning Algorithm.

Lim Y., et al., "Wireless Intrusion Detection and Response", IEEE, 8 Pages, 2003.

Manolakis D.E., "Efficient Solution and Performance analysis of 3-D Position Estimatin by Trilateration", IEEE Transactions on Aerospace and Electronic Systems, vol. 32, No. 4, Oct. 1996.

Mao, et al., "Wireless sensor network localization techniques" Computer Networks, Elsevier Science Publishers B.V;, Amsterdam, NL LNKD—DOI: 10.1016/ J.Comnet. 2006.11.018, vol. 51, No. 10, May 6, 2007, pp. 2529-2553, XP022063022 ISSN: 1389-1286.

McCrady, et al. "Mobile Ranging with Low Accuracy Clocks", Radio and Wireless Conference 1999, pp. 85-88.

Murad Abusubaih, et al., "A dual distance measurement scheme for indoor IEEE 802.11 wireless local area networks" Mobile Wireless Communications Networks, 2007 9th IFIP International Conference on, IEEE, Piscataway, NJ, USA, Sep. 19, 2007, pp. 121-125, XP031359266 ISBN: 978-1-4244-1719-3.

Watkins L., et al., "A Passive Approach to Rogue Access Point Detections", IEEE, 6 pages, 2007.

Xinrong Li, et al., "Comparison of indoor geolocation methods in DSSS and OFDM wireless LAN systems" Vehicular Technology Conference, 2000. IEEE VTS Fall VTC 2000. 52nd Sep. 24-28, 2000, Piscataway, NJ, USA,IEEE, vol. 6, Sep. 24, 2000, pp. 3015-3020, XP010525129 ISBN: 978-0/7803-6507-0 abstract p. 3017, right-hand column.

International Search Report for PCT / US2009 / 069167.

\* cited by examiner

POST-DEPLOYMENT CALIBRATION OF WIRELESS BASE STATIONS FOR WIRELESS POSITION DETERMINATION

CLAIM OF PRIORITY UNDER 35 U.S.C. §119

This application is a continuation of U.S. application Ser. No. 12/643,676, entitled "POST-DEPLOYMENT CALIBRATION FOR WIRELESS POSITION DETERMINATION," filed Dec. 21, 2009, which claims the benefit of and priority to U.S. Provisional Application No. 61/139,928 entitled "INDOOR WLAN NETWORK CALIBRATION FOR POSITIONING" filed Dec. 22, 2008, each of which is assigned to the assignee hereof and hereby expressly incorporated by reference herein.

FIELD OF DISCLOSURE

Aspects of this disclosure generally relate to wireless communication systems, and more specifically, to the use of post-deployment calibration for wireless network position determination.

REFERENCE TO CO-PENDING APPLICATIONS FOR PATENT

The present application for patent is related to the following co-pending U.S. Patent Applications:

"WIRELESS POSITION DETERMINATION USING ADJUSTED ROUND TRIP TIME MEASUREMENTS" by Aggarwal et al., having Ser. No. 12/622,289, filed on Nov. 19, 2009, assigned to the assignee hereof, and expressly incorporated by reference herein.

"A METHOD AND APPARATUS FOR PROVIDING AND UTILIZING LOCAL MAPS AND ANNOTATIONS IN LOCATION DETERMINATION" by Das et al., having Ser. No. 12/641,225, filed on Dec. 17, 2009, assigned to the assignee hereof, and expressly incorporated by reference herein.

BACKGROUND

Mobile communications networks are in the process of offering increasingly sophisticated capabilities associated with the motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a 911 call in the United States.

In conventional digital cellular networks, position location capability can be provided by Advanced Forward Link Trilateration (AFLT). AFLT may compute the position of a wireless device from the wireless device's measured time of arrival of radio signals transmitted from a plurality of base stations Improvements to AFLT have been realized by utilizing hybrid position location techniques, where the mobile device may employ a Satellite Positioning System (SPS) receiver. The SPS receiver may provide position information independent of the information derived from the signals transmitted by the base stations. Moreover, position accuracy can be improved by combining measurements derived from both SPS and AFLT systems using conventional techniques.

Additionally, with the increased proliferation of micro electro-mechanical systems (MEMS), small, on-board sensors may be used to provide additional relative position, velocity, acceleration and/or orientation information. However, position location techniques based upon signals provided by SPS and/or cellular base stations may encounter difficulties when the mobile device is operating within a building and/or within urban environments. In such situations, multipath and/or degraded signal strength can significantly reduce position accuracy, and can slow the "time-to-fix" to unacceptably long time periods.

Such shortcomings of SPS and cellular positioning may be overcome by exploiting signals used existing wireless data networks, such as Wi-Fi (e.g., Institute of Electrical and Electronics Engineers (IEEE) 802.11x standards) and/or WiMAX (IEEE 802.16), and having elements within the network infrastructure derive position information of the mobile device. Techniques used in such wireless data networks may exploit round trip time (RTT) and/or signal strength measurements (RSSI) derived from signals utilized within these networks. Utilizing such measurement techniques to accurately determine position typically involves knowledge of the configuration of various elements within the network, such as, for example, the location of the wireless access points/femtocells, etc.

In practice, some network elements used for position determination may not be properly configured, and such misconfigurations could adversely impact the accuracy of the determined position solution. For example, if wireless access point is moved to a different location and the location it reports is not updated, positions determined using the old location of the wireless access point may be unacceptably inaccurate.

Accordingly, it may be desirable to implement calibration techniques which can update and/or compensate for improperly configured network elements to maintain position determination accuracy, while reducing costly post-deployment efforts for network infrastructure maintenance.

SUMMARY

Exemplary embodiments of the invention are directed to apparatuses and methods for post-deployment calibration for use in wireless position determination. In one embodiment, a method for calibrating a misconfigured wireless access point used for determining a position of a mobile station is presented. The method may include receiving a position of at least one mobile station and wireless signal model measurements derived from packets exchanged between the at least one mobile station and a plurality of wireless access points. The method may further include receiving positions and/or identities of the plurality of wireless access points used in determining the position of the at least one mobile station and comparing a position of the at least one mobile station with wireless signal model measurements. The method may further include identifying a misconfigured wireless access point based upon the comparing.

In another embodiment a method for calibrating a misconfigured wireless access point at a mobile station is presented. The method may include receiving positions associated with a plurality of wireless access points, and determining a position of the mobile station based upon a wireless signal model. The method may further include comparing the position of the mobile station and the wireless signal model with the positions associated with the plurality of wireless access points, and determining whether at least one wireless access point is misconfigured.

In yet another embodiment, an apparatus for calibrating a misconfigured wireless access point used for determining a position of a mobile station is described. The apparatus may include a wireless transceiver, a processing unit coupled to the wireless transceiver, and a memory coupled to the processing unit. The memory may store executable instructions and data which cause the processing unit to receive a position of at least one mobile station and wireless signal model measurements derived from packets exchanged between the at least one mobile station and a plurality of wireless access points. Additional instructions stored in memory may cause the processing unit to receive positions and/or identities of the plurality of wireless access points used in determining the position of the at least one mobile station, compare a position of the at least one mobile station with wireless signal model measurements, and identify a misconfigured wireless access point based upon the comparing.

In yet another embodiment, a mobile station which calibrates a misconfigured wireless access point is presented. The mobile station may include a wireless transceiver, a processing unit coupled to the wireless transceiver, and a memory coupled to the processing unit. The memory may store executable instructions and data for causing the processing unit to receive positions associated with a plurality of wireless access points, determine a position of the mobile station based upon a wireless signal model, compare the position of the mobile station and the wireless signal model with the positions associated with the plurality of wireless access points, and determine whether at least one wireless access point is misconfigured.

Various embodiments may benefit from having the network and/or mobile stations compensate for improperly configured network elements. Such advantages can reduce network operating costs by reducing the number of post deployment inspections and maintenance calls for system upkeep. Further, various embodiments can also potentially lead to more accurate positioning, when the locations and existence of network elements are accurately known.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
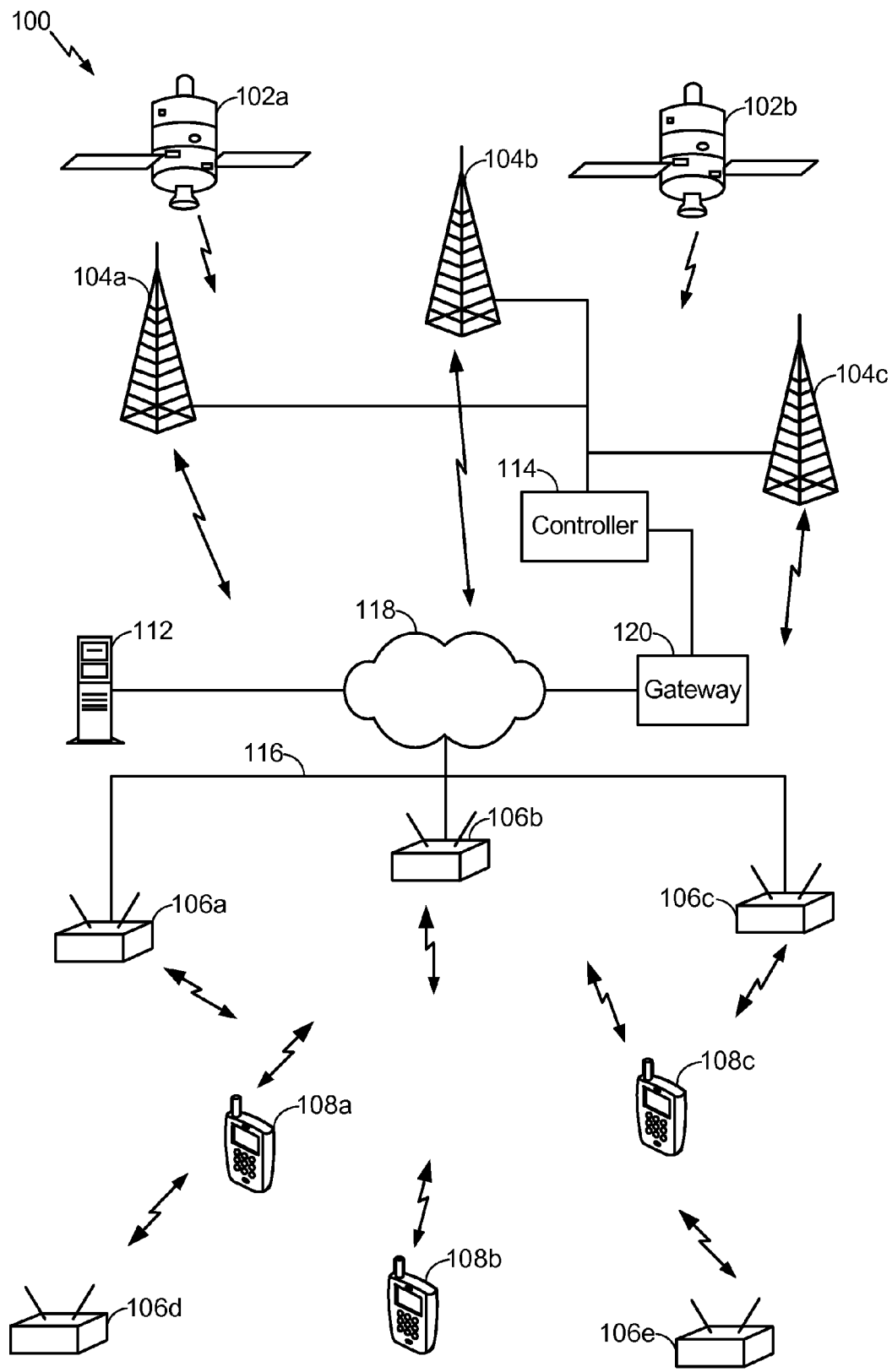
FIG. 1 is a diagram of an exemplary operating environment for one or more mobile stations in communications with a network consistent with an embodiment of the disclosure.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processing units, or by a combination of both. Additionally, these sequence of actions described herein can be considered to be embodied entirely within any form of computer readable storage medium having stored therein a corresponding set of computer instructions that upon execution would cause an associated processing unit to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As will be presented in more detail below, the position determination of a mobile station may rely upon information derived from signals exchanged between the mobile station and a plurality of wireless access points/femtocells, etc. Such signal-derived information may include for example, round trip time (RTT), received signal strength/received signal strength indicator (RSS/RSSI) and/or Angle of Arrival (AoA). Auxiliary information regarding the wireless access points, such as, for example, their location described in a reference coordinate frame, may also be used. The signal-derived information and the auxiliary information may be utilized along with one or more wireless signal models (e.g., RTT, RSSI and/or AoA based models) to provide accurate estimates of position for the mobile station. If any type of auxiliary information provided to the wireless signal model(s) is incorrect, and/or if a parameter used within a wireless signal model is inaccurate, the position solution of the mobile station may be degraded. For example, if the position of a wireless access point is incorrect because it was moved, and its location was not updated to reflect its new location, the improperly configured wireless access point may adversely affect the position solution accuracy for mobile station.

As used herein, the term "misconfigured wireless access point" may be used to designate a wireless access point which is associated with any type of incorrect, outdated, or missing piece of information. Accordingly, a misconfigured wireless access point may be associated with an incorrect location and/or any inaccurate parameter (e.g., a delay time, signal power decay, etc.) used within the wireless signal model(s). Calibration approaches described herein may be used to discover and correct the misconfigured wireless access points without having to manually perform such corrections. Because these techniques may be performed automatically, they can be useful after the network is initially set-up and deployed (i.e., post-deployment).

FIG. 1 is a diagram of an exemplary operating environment 100 for one or more mobile stations 108 in communications with a network consistent with an embodiment of the disclosure. The operating environment 100 may contain one or more different types of wireless communication systems and/or wireless positioning systems. In the embodiment shown in FIG. 1, a Satellite Positioning System (SPS) may be used as an independent source of position information for the mobile stations 108. Each mobile station 108a-108c may include one or more dedicated SPS receivers specifically designed to receive signals for deriving geo-location information from the SPS satellites 102.

The operating environment 100 may also include a back end network (also referred to herein as a back haul network) which may include a wide area network. The back end network may include one or more wired and/or wireless networks, and can also provide Internet and/or cellular data network access. The back end network may further include one or more Wide Area Network Wireless Access Points (WAN-WAPs) 104, which may be used for wireless voice and/or data communication, and potentially as another source of independent position information for the mobile stations 108. The WAN-WAPs 104 may be incorporated into wireless wide area network (WWAN), which may include cellular base stations at known locations, and/or other wide area wireless systems, such as, for example, WiMAX (e.g., 802.16). The WWAN may further include one or more Controllers 114 (such as, for example, a Base Station Controller), and a Gateway 120 to interconnect the WWAN with a wide area network 118. Other known network components may further be included but are not shown in FIG. 1 for simplicity. Typically, each WAN-WAPs 104a-104c within the WWAN may operate from fixed, known positions, and provide network coverage over large metropolitan and/or regional areas.

The back end network may further include a separate positioning server (PS) 112, which may be connected to the wide area network 118. The PS 112 may perform post-deployment calibration to compensate for misconfigured wireless access points. Additionally, the PS 112 may assist the mobile stations 108 in determining their positions by providing information regarding individual wireless access points and/or information regarding other network elements. The back end network may also include an interconnecting network 116 for interconnecting the local area network to the wide area network 118. Network 116 may be a wired network as shown in FIG. 1, however in other embodiments, it may be, either in whole or in part, a wireless network. Moreover, various embodiments may have the PS functionality placed in another portion of the back end network.

The operating environment 100 may further include a wireless local area network (WLAN). The WLAN may include one or more Local Area Network Wireless Access Points (LAN-WAPs) 106. The WLAN may be used for wireless voice and/or data communication, as well as another independent source of position data. Each LAN-WAPs 106a-106e may connect to the back end network using a wireless and/or wired manner. For example, as shown in FIG. 1, LAN-WAPs 106a-106c may interface to the wide area network 118 over the interconnecting network 116, while the LAN-WAPs 106d and 106e may communicate to the back-end network using a wireless connection. When in range, each mobile station 108a-108c may wirelessly exchange packets with one or more LAN-WAPs 106. The WLAN may typically operate in buildings and perform communications over smaller geographic regions than a WWAN, and it may operate under the protocols of a Wi-Fi network (IEEE 802.11x), Bluetooth Network, a femtocell, etc.

The mobile stations 108 may derive other independent position information from any one or a combination of the SPS transmitters 102, the WAN-WAPs 104, and/or the LAN-WAPs 106. Each of the aforementioned systems can provide an independent estimate of the position for mobile stations 108 using different techniques. In some embodiments, the mobile stations 108 may combine the solutions derived from each of the different types of transmitters/access points to improve the accuracy of the position data. In the section below, details for conventionally determining the position of the mobile stations 108 are briefly presented.

Further referring to FIG. 1, the mobile stations 108 may be representative of any type of portable wireless device. Thus, by way of example but not limitation, mobile stations 108 may include a radio device, a cellular telephone device, a computing device, a personal communication system (PCS) device, or other like movable wireless communication equipped device, appliance, or machine.

As used herein, the term "wireless device" may refer to any type of wireless communication device which may transfer information over a network and also have position determination and/or navigation functionality. The wireless device may be any mobile station, cellular mobile terminal, personal communication system (PCS) device, personal navigation device, laptop, personal digital assistant, or any other suitable mobile device capable of receiving and processing network and/or SPS signals.

When deriving position data using the SPS, the mobile stations 108 may utilize a receiver specifically designed for use with the SPS that extracts position, using conventional techniques, from a plurality of signals transmitted by available SPS transmitters 102. The transmitters may be positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the mobile station 108 may include a cellular transceiver and processing unit that can exploit the base station signals to derive position. It should be understood that a digital cellular network may include additional base stations or other resources not shown in FIG. 1. While WAN-WAPs 104 may actually be moveable or otherwise capable of being relocated, for illustration purposes it will be assumed that they are essentially arranged in a fixed position. The mobile stations 108 may also perform position determination using conventional time-of-arrival techniques such as, for example, Advanced Forward Link Trilateration (AFLT). In other embodiments, any WAN-WAP 104a-104c may take the form of a WiMAX wireless networking base station. For example, the mobile stations 108 may determine its position using time-of-arrival (TOA) techniques from signals provided by the WAN-WAPs 104. The mobile stations 108 may determine positions either in a stand-alone mode, or using the assistance of positioning server 112 and/or the wide area network 118 using conventional TOA techniques. Note that embodiments of the disclosure may include having the mobile stations 108 determine position information using WAN-WAPs 104 which are different types. For example, some WAN-WAPs 104 may be cellular base stations, and other WAN-WAPs may be WiMAX base stations. In such an operating environment, the mobile station 108 may be able to exploit the signals from each different type of WAN-WAP, and further combine the derived position solutions to improve accuracy.

When deriving independent position information of any mobile station based upon conventional techniques using the WLAN, such mobile stations 108 may utilize time of arrival and/or signal strength techniques with the assistance of the positioning server 112 and the wide area network 118. The conventional position determination techniques may also be used in conjunction with other various wireless communication networks such as a wireless wide area network (WWAN), a wireless local area network (WLAN), a wireless personal area network (WPAN), and so on.

The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

The above described localization techniques, as well as any other known conventional position determination approaches, may be used in conjunction with various network centric position determination embodiments to improve accuracy and/or performance. Network centric embodiments which may utilize conventionally determined localization information will be described in more detail in subsequent sections of the description.

Figure 2:
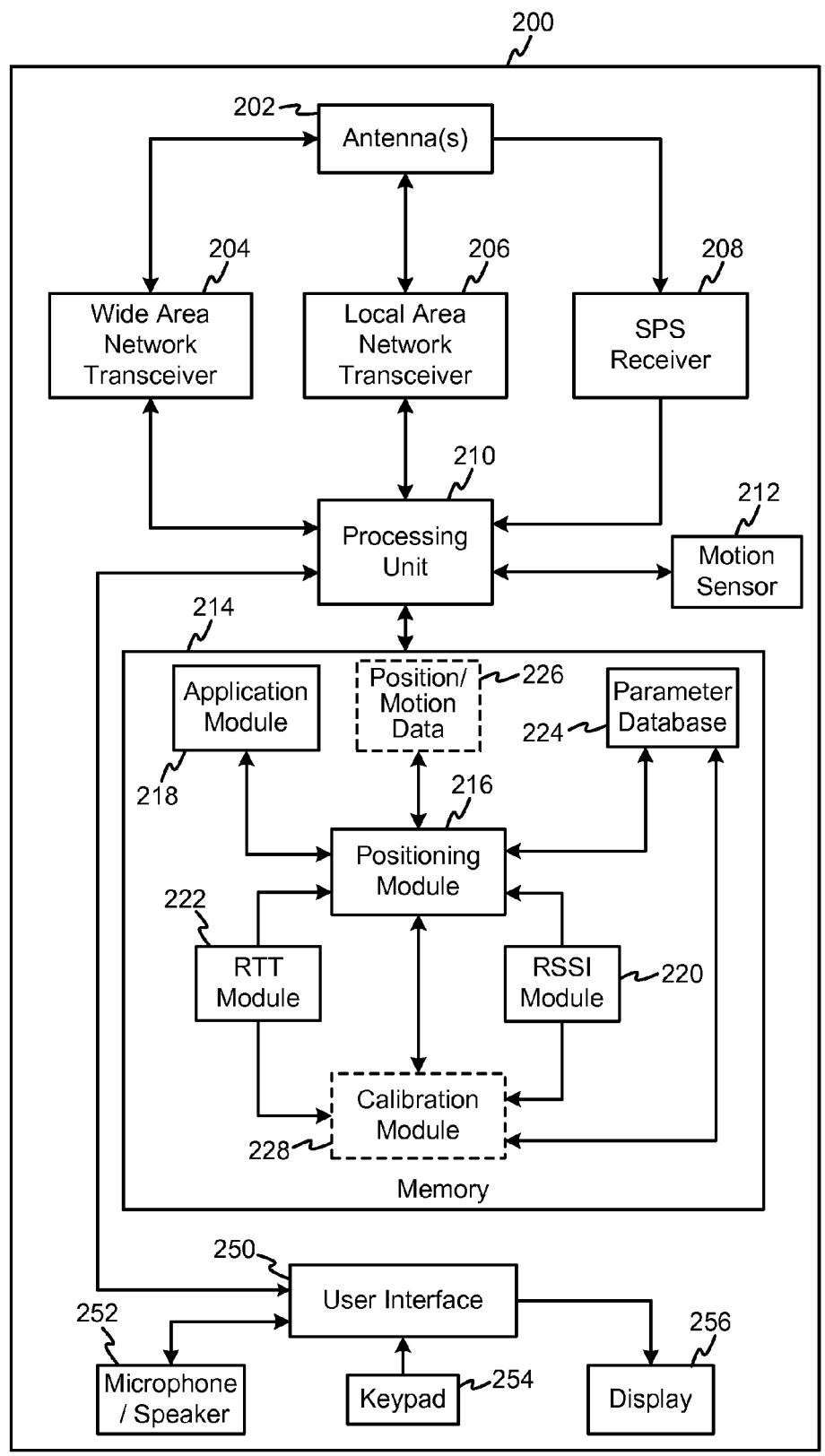
FIG. 2 is a block diagram illustrating various components of an exemplary mobile station.

FIG. 2 is a block diagram illustrating various components of an exemplary mobile station 200. For the sake of simplicity, the various features and functions illustrated in the diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The mobile station may include one or more wide area network transceiver(s) 204 that may be connected to one or more antennas 202. The wide area network transceiver 204 comprises suitable devices, hardware, and/or software for communicating with and/or detecting signals to/from WAN-WAPs 104, and/or directly with other wireless devices within a network. In one aspect, the wide area network transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wireless networking technologies may be used, for example, WiMAX (802.16), etc. The mobile station may also include one or more local area network transceivers 206 that may be connected to one or more antennas 202. The local area network transceiver 206 comprises suitable devices, hardware, and/or software for communicating with and/or detecting signals to/from LAN-WAPs 106, and/or directly with other wireless devices within a network. In one aspect, the local area network transceiver 206 may comprise a Wi-Fi (802.11x) communication system suitable for communicating with one or more wireless access points; however in other aspects, the local area network transceiver 206 comprise another type of local area network technology, personal area network technology (e.g., Bluetooth), etc. Additionally, any other type of wireless networking technologies may be used, for example, Ultra Wide Band, ZigBee, wireless USB, etc.

As used herein, the term "wireless access point" (WAP) may be used to refer to LAN-WAPs 106, femtocells, and/or WAN-WAPs 104, Bluetooth transceivers, etc. Specifically, in the description presented below, when the term "WAP" is used, it should be understood that embodiments may include a mobile station 200 that can exploit signals from a plurality of LAN-WAPs 106, a plurality of WAN-WAPs 104, femtocells, or any combination of technologies. The specific type of WAP being utilized by the mobile station 200 may depend upon the environment of operation. Moreover, the mobile station 200 may dynamically select between the various types of WAPs in order to arrive at an accurate position solution.

An SPS receiver 208 may also be included in mobile station 200. The SPS receiver 208 may be connected to the one or more antennas 202 for receiving SPS signals. The SPS receiver 208 may comprise any suitable hardware and/or software for receiving and processing SPS signals. The SPS receiver 208 may request information and operations as appropriate from the other systems, and perform the calculations necessary to determine the mobile station 200's position using measurements obtained by any suitable SPS algorithm.

A motion sensor 212 may be coupled to processing unit 210 to provide relative movement and/or orientation information which is independent of motion data derived from signals received by the wide area network transceiver 204, the local area network transceiver 206 and the SPS receiver 208. By way of example but not limitation, motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, motion sensor 212 may include a plurality of different types of devices and combine their outputs in order to provide motion information.

A processing unit 210 may be connected to the wide area network transceiver 204, local area network transceiver 206, the SPS receiver 208 and the motion sensor 212. The processing unit may include one or more microprocessors, microcontrollers, and/or digital signal processors that provide processing functions, as well as other calculation and control functionality. The processor 210 may also include memory 214 for storing data and software instructions for executing programmed functionality within the mobile station. The memory 214 may be on-board the processing unit 210 (e.g., within the same IC package), and/or the memory 214 may be external to the processing unit and functionally coupled over a data bus. The details of software functionality associated with aspects of the disclosure will be discussed in more detail below.

A number of software modules and/or data tables may reside in memory 214 and be utilized by the processing unit 210 in order to manage communications and positioning determination functionality. Additionally, in one embodiment, the mobile station 200 may perform post-deployment calibration, as will be described in more detail below. Further referring to FIG. 2, memory 214 may include and/or otherwise receive a positioning module 216, an application module 218, a received signal strength indicator (RSSI) module 220, a round trip time (RTT) module 222, and an optional calibration module 228 (illustrated in dashed lines). One should appreciate that the organization of the memory contents as shown in FIG. 2 is merely exemplary, and as such the functionality of the modules and/or data structures may be combined, separated, and/or be structured in different ways depending upon the implementation of the mobile station 200.

The application module 218 may be a process running on the processing unit 210 of the mobile device 200, which requests position information from the positioning module 216. Applications typically run within an upper layer of the software architectures, and may include Indoor Navigation, Buddy Locator, Shopping and Coupons, Asset Tracking, and location Aware Service Discovery. The positioning module 216 may derive the position of the mobile device 200 using information derived from various wireless signal models, and optionally from the calibration module 228. The wireless signal models may include, for example, an RTT model which may use the round trip times measured from signals exchanged with a plurality of WAPs. In order to accurately determine position using RTT techniques, reasonable estimates of a variety of parameters associated with each WAP should be known, and may determined using the calibration techniques described herein. The measured RTTs may be determined by the RTT module 222, which can measure the timings of signals exchanged between the mobile station 200 and the WAPs to derive RTT information. Once measured, the RTT values may be passed to the positioning module 216 to assist in determining the position of the mobile device 200.

The positioning module 216 may utilize other wireless signal models and corresponding measurements for position determination. In one embodiment, the amplitude values of the signals transmitted by the WAPs may be used to provide signal strength information. These amplitude values may be determined in the form of RSSI measurements determined by RSSI module 220. The RSSI module 220 may provide amplitude and statistical information regarding the signals to the position module 216. Other signal models may use angle of arrival (AoA) to provide angle information which may also be utilized. The positioning module 216 may use such information to accurately determine position. The position may then be output to the application module 218 in response to its aforementioned application program request. In addition, the positioning module 216 may utilize a parameter database 224 for exchanging operational parameters. Such parameters may include the determined processing times for each WAP, the WAPs' positions in a common coordinate frame, various parameters associated with the network, initial processing time estimates, processing time estimates determined previously, etc.

In some embodiments, the mobile station may perform post-deployment calibration using the optional calibration module 228. The calibration module may refine various parameters which are used in one or more wireless signal models in order to compensate for misconfigured wireless access points. The calibration module may directly utilize RTT information from RTT module 222, position information of the mobile station 200 from positioning module 216, and/or RSSI information from RSSI module 220. The calibration module may also use AoA information, which may be determined using signal phase information and/or multiple antenna techniques. For example, determining the wireless signal model parameter may comprise determining AoA measurements based upon signals from the misconfigured wireless access point. Additional information, such as, for example, known locations of one or more wireless access points, may be obtained from parameter database 224. The calibration module 228 may refine and/or correct information associated with one or more wireless access points, and then provide this information back to the positioning module 216 for more accurate position determination of the mobile station. This calibration solution(s) may also be stored in parameter database 224 to update/improve the accuracy of information stored therein.

In other embodiments, other information can also aid position determination, and may optionally include auxiliary position and/or motion data which may be determined from other sources. The auxiliary position data may be incomplete or noisy, but may be useful as another source of independent information for estimating the processing times of the WAPs. As illustrated in FIG. 2 using dashed lines, mobile device 200 may optionally store auxiliary position/motion data 226 in memory which may be derived from information received from other sources as described below. Moreover, in other embodiments, other information may include, but not be limited to, information that can be derived or based upon Bluetooth signals, beacons, RFID tags, and/or information derived from map (e.g., receiving coordinates from a digital representation of a geographical map by, for example, a user interacting with a digital map).

In one embodiment, all or part of auxiliary position/motion data 226 may be derived from information supplied by motion sensor 212 and/or SPS receiver 208. In other embodiments, auxiliary position/motion data 226 may be determined through additional networks using non-RTT techniques (e.g., AFLT within a CDMA network). In certain implementations, all or part of auxiliary position/motion data 226 may also be provided by way of motion sensor 212 and/or SPS receiver 208 without further processing by processing unit 210. In some embodiments, the auxiliary position/motion data 226 may be directly provided by the motion sensor 212 and/or SPS receiver 208 to the processing unit 210. Position/motion data 226 may also include acceleration data and/or velocity data which may provide direction and speed. In other embodiments, position/motion data 226 may further include directionality data which may only provide direction of movement.

While the modules shown in FIG. 2 are illustrated in the example as being contained in memory 214, it is recognized that in certain implementations such procedures may be provided for or otherwise operatively arranged using other or additional mechanisms. For example, all or part of calibration module 228, positioning module 216 and/or application module 218 may be provided in firmware. Additionally, while in this example positioning module 216 and calibration module 228 are illustrated as being separate features, it is recognized, for example, that such procedures may be combined together as one procedure or perhaps with other procedures, or otherwise further divided into a plurality of sub-procedures.

Processing unit 210 may include any form of logic suitable for performing at least the techniques provided herein. For example, processing unit 210 may be operatively configurable based on instructions in memory 214 to selectively initiate one or more routines that exploit motion data for use in other portions of the mobile device.

The mobile station 200 may include a user interface 250 which provides any suitable interface systems, such as a microphone/speaker 252, keypad 254, and display 256 that allows user interaction with the mobile station 200. The microphone/speaker 252 provides for voice communication services using the wide area network transceiver 204 and/or the local area network transceiver 206. The keypad 254 comprises any suitable buttons for user input. The display 256 comprises any suitable display, such as, for example, a backlit LCD display, and may further include a touch screen for additional user input modes.

As used herein, mobile station 108 may be any portable or movable device or machine that is configurable to acquire wireless signals transmitted from, and transmit wireless signals to, one or more wireless communication devices or networks. As shown in FIGS. 1 and 2, the mobile device is representative of such a portable wireless device. Thus, by way of example but not limitation, mobile station 108 may include a radio device, a cellular or other wireless communication device, personal communication system (PCS) device, personal navigation device (PND), Personal Information Manager (PIM), Personal Digital Assistant (PDA), laptop, a computing device, or other like movable wireless communication equipped device, appliance, or machine. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

As discussed above, the term "wireless device" may refer to any type of wireless communication device which may transfer information over a network and also have position determination and/or navigation functionality. The wireless device may be any mobile station, cellular mobile terminal, personal communication system (PCS) device, personal navigation device, laptop, personal digital assistant, or any other suitable mobile device capable of receiving and processing network and/or SPS signals.

Accordingly, in one embodiment, a mobile station 200 may calibrate a misconfigured wireless access point. The mobile station 200 may include a means for receiving positions associated with a plurality of wireless access points (e.g., 206), a means for determining a position of the mobile station 200 based upon a wireless signal model (e.g., 216), a means for comparing the position of the mobile station 200 and the wireless signal model with the positions associated with the plurality of wireless access points (e.g., 228); and a means for determining whether at least one wireless access point is misconfigured (e.g., 228).

Figure 3:
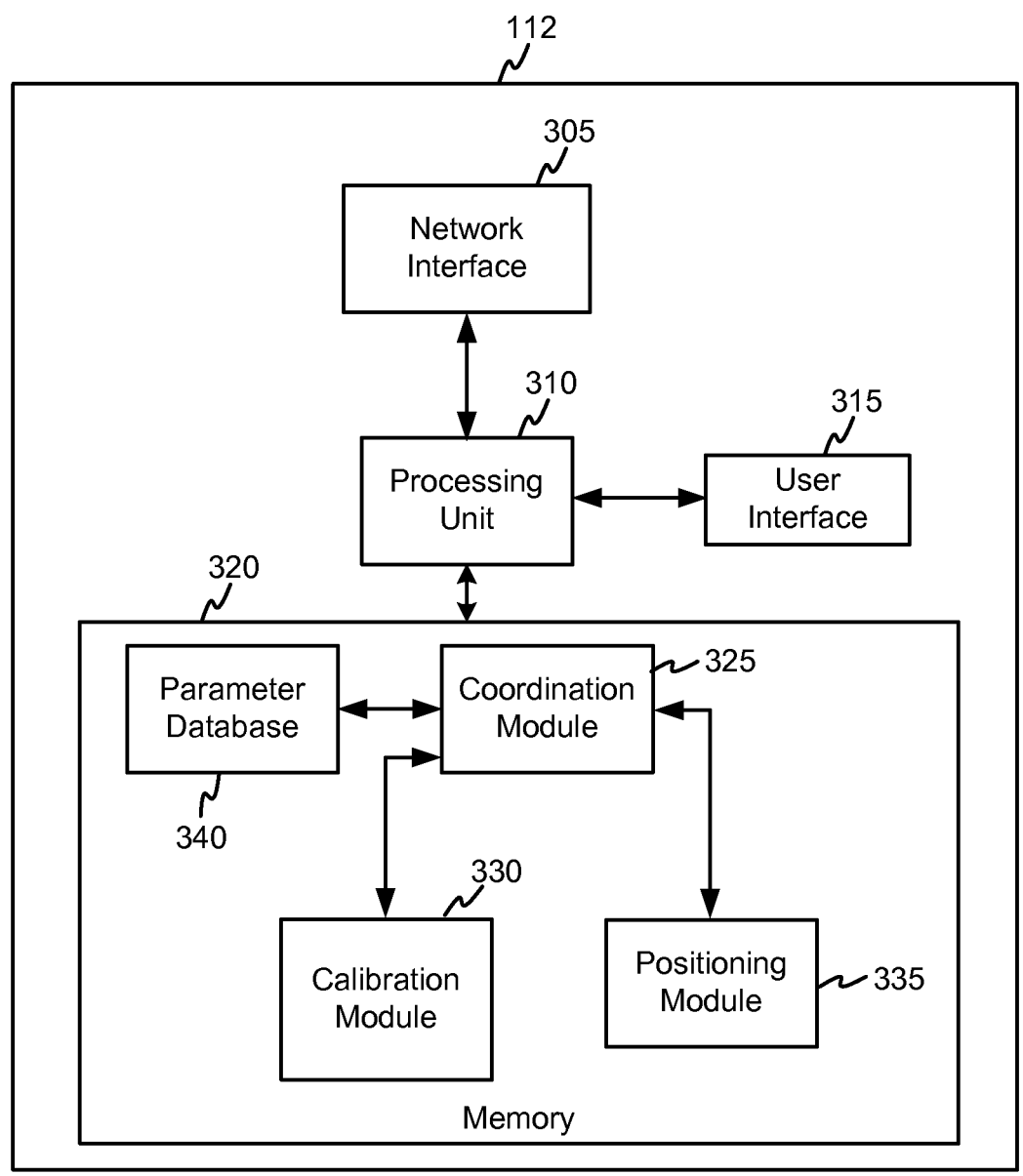
FIG. 3 is a block diagram illustrating various components of an exemplary Positioning Server (PS).

FIG. 3 is a block diagram illustrating one exemplary embodiment of a positioning server (PS) 112. The positioning server may be a separate device which resides within the back end network. The PS 112 may coordinate the reception of information provided by mobile station(s) 108 to perform post-deployment calibration of one or more misconfigured WAPs. Additionally, the PS 112 may provide information regarding network elements to assist the mobile station 108 in determining its position. In other embodiments, the PS 112 may determine the position of one or more mobile stations 108 using network centric methods. Once the PS 112 calibrates at least one WAP, the corrected parameter(s) may be provided back to the mobile device, and/or stored in a local parameter database for future use. When the PS 112 may typically reside on the back end network, in some embodiments, such calibration capability may be optionally incorporated into one or more WAPs having been modified to perform the calibration functionality.

For the sake of simplicity, the various features and functions illustrated in the block diagram of FIG. 3 are connected together using a common bus which is meant to represent that these various features and functions are operatively coupled together. Those skilled in the art will recognize that other connections, mechanisms, features, functions, or the like, may be provided and adapted as necessary to operatively couple and configure an actual PS. Further, it is also recognized that one or more of the features or functions illustrated in the example of FIG. 3 may be further subdivided or two or more of the features or functions illustrated in FIG. 3 may be combined.

The PS 112 may include a network interface 305 that may be wired and/or wireless for communicating over a WAN and/or LAN. In one embodiment, the PS 112 may communicate over with other network elements in the back end network via WAN 118, which may include communications with WWAN via the gateway 120. The PS may also communicate using network interface 305 over the WAN 118 and/or interconnecting network 116 to exchange information with one or more WAPs. The network interface 305 may utilize any known wired networking technology (e.g., Ethernet) and/or wireless technology (e.g., Wi-Fi (IEEE 802.11x)).

A processing unit 310 may be connected to the network interface 305, a user interface 315 and memory 320. The processing unit 310 may include one or more microprocessors, microcontrollers, and/or digital signal processors that provide processing functions, as well as other calculation and control functionality. The processing unit 310 may access memory 320 for reading/writing data and/or software instructions for executing programmed functionality. The memory 320 may be on-board the processing unit 310 (e.g., within the same IC package), and/or the memory may be external to the processing unit and functionally coupled over a data bus.

A number of software modules and/or data tables may reside in memory 320 and be utilized by the processing unit 310 for managing both WAP coordination and/or positioning determination functionality. As illustrated here, within memory 320, the PS 112 may further include or otherwise provide a coordination module 325, a calibration module 330, a positioning module 335 and/or a parameter database 340. The coordination module 325 may interrogate and/or receive information from one or more mobile stations 108. Such information may include the mobile station's self-derived position, and information it used to derive its position. This information may be requested by the PS 112, or it may be pushed down at the initiative of the mobile station 108. When requested by the PS 112, a mobile station may provide, for example, packet derived RTT and/or RSSI measurements, identification of the WAPs used to derive position, positions of each WAP used by the mobile station 108 to determine position, etc. Once this information is received by the PS 112, the coordination module 325 may perform further processing and then pass the information on to the calibration module 330. The calibration module may analyze the received information to identify a misconfigured WAP. If the received information contains sufficient information from a plurality of mobile stations, the calibration module 330 may combine their measurements and correct parameters in one or more misconfigured WAPs. For example, if a WAP was misconfigured with the wrong position, the calibration module 330, in conjunction with positioning module 335, may use the position of a plurality of mobile stations to determine the correct position of the misconfigured WAP. Once the parameter(s) are calibrated for one or more misconfigured WAPs, these parameter(s) may be sent back to the mobile station(s) 108, and/or the corrected parameter(s) may be stored in parameter database 340 for future use.

While the software modules shown in FIG. 3 are illustrated in the example as being contained in memory 320, it should be recognized that in certain implementations such procedures may be provided for or otherwise operatively arranged using other or additional mechanisms. For example, all or part of coordination module 325, calibration module 330, parameter database 340 and/or positioning module 335 may be provided in firmware. Additionally, while in FIG. 3 the modules are shown as distinct entities, it should be understood that, for example, the illustrated modules may be combined together as one procedure, or perhaps with other modules not illustrated, or otherwise be further partitioned into differing groups of procedures.

Accordingly, an embodiment may include an apparatus (e.g., 112) for calibrating a misconfigured wireless access point used for determining a position of a mobile station 108. The apparatus 112 may include a means for receiving a position of a mobile station(s) 108 (e.g., 305), and wireless signal model measurements derived from packets exchanged between the mobile station(s) and a plurality of wireless access points (e.g., 305), a means for receiving positions and/or identities of the plurality of wireless access points used in determining the position of the at least one mobile station 108 (e.g., 305), a means for comparing a position of the at least one mobile station with wireless signal model measurements (e.g., 330), and means for identifying a misconfigured wireless access point based upon the comparing (e.g., 330).

Figure 4:
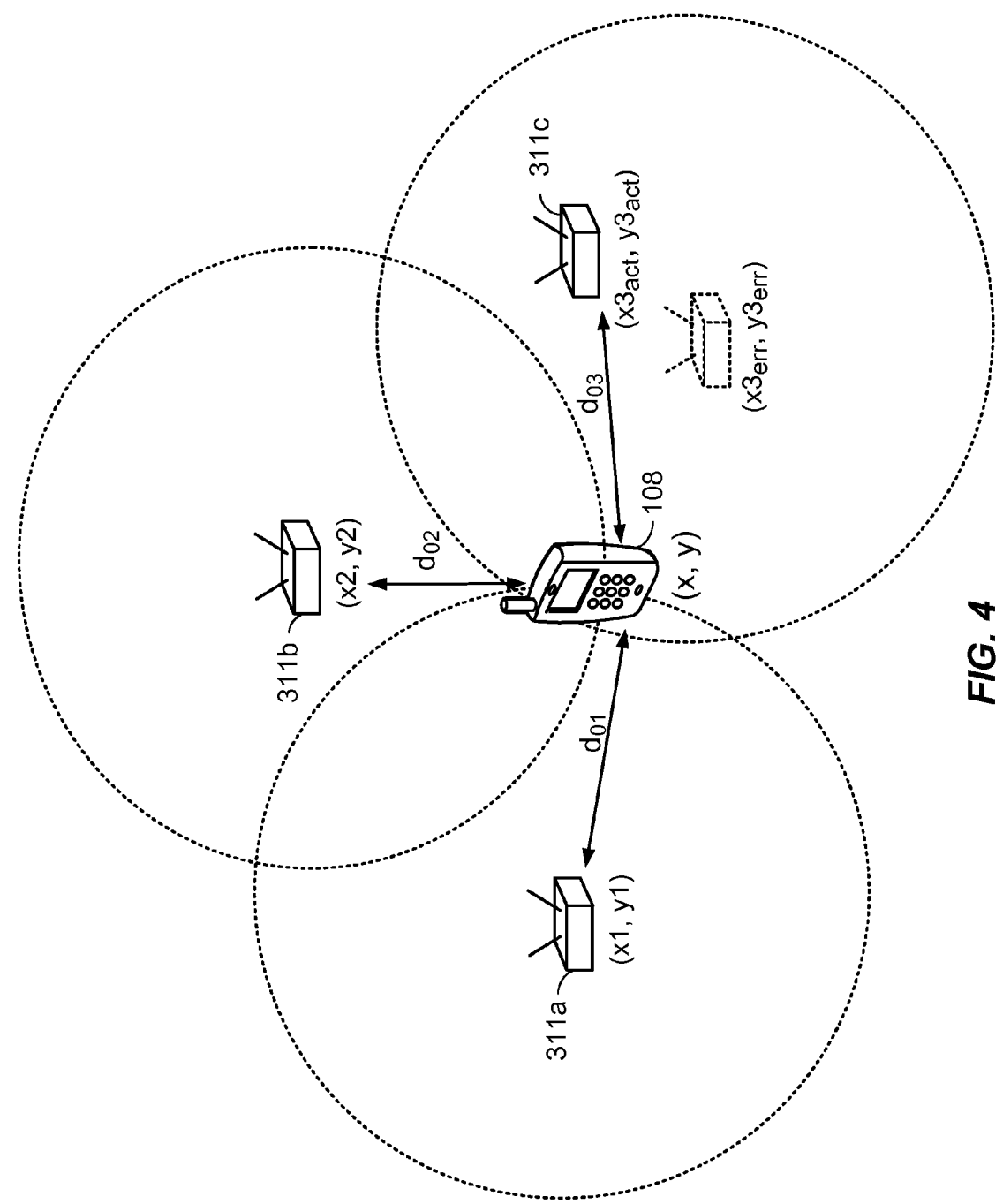
FIG. 4 is a drawing illustrating an exemplary embodiment showing a number of Local Area Network-Wireless Access Points (LAN-WAPs) communicating with a mobile station, wherein one LAN-WAP is misconfigured.

FIG. 4 illustrates an exemplary embodiment showing a number of Local Area Network-Wireless Access Points (LAN-WAPs) communicating with a mobile station, wherein one LAN-WAP may be misconfigured. In FIG. 4, the mobile station 108 may communicate with a plurality of LAN-WAPs 311 by exchanging packets over wireless signals. In this example, mobile station 108 may be positioned at location (X, Y) and may communicate with LAN-WAP1 311a, LAN-WAP2 311b, LAN-WAP3 311c via wireless links. In this example, LAN-WAP1 311a and LAN-WAP2 311b are properly configured with respect to their position. However, LAN-WAP3 311c is misconfigured with respect to its position. While this exemplary embodiment illustrates three LAN-WAPs, it is understood that this is merely exemplary and any number of LAN-WAPs and/or wireless links may be utilized.

Further referring to FIG. 4 in more detail, LAN-WAP1 311a may be positioned at location $(X_1, Y_1)$ and LAN-WAP2 311b may be positioned at location $(X_2, Y_2)$, where each of these positions reflects their true location. The mobile station 108 "believes" LAN-WAP3 311c is at erroneous position $(X_{3err}, Y_{3err})$; however, its actual position is at $(X_{3act}, Y_{3act})$. The positions of each LAN-WAP that are used by the mobile station may be reported by the respective LAN-WAP in a beacon signal. Additionally, the LAN-WAP positions may be read from data structures stored in the parameter database 224 within the mobile station 108 and/or the parameter database 340 within the PS 112. In some embodiments, database may store the positions in the form of annotated maps.

The positions of the LAN-WAPs, along with their respective signal measurements, may be used along with one or more wireless models to derive the position of the mobile station 108. The signal measurements made using packets exchanged between mobile station 108 and LAN-WAP1

311a, LAN-WAP2 311b, and LAN-WAP3 311c can provide the respective distances $d_{o1}$, $d_{o2}$, and $d_{o3}$. Mobile station 108 may measure these distances utilizing ranging techniques based upon one or more wireless signal models (e.g., RTT and/or RSSI ranging models) and/or further refine their location (e.g., using AoA models). For example, mobile station 108 may send packets of data to a plurality of local LAN-WAPs 311. The local LAN-WAPs 311 can process the packets of data and send responses back to the mobile station 108. Mobile station 108 may then estimate the RTT associated with the exchanged packets. The RTT can be the time elapsed between the transmission of a packet of data sent from the mobile station 108 to any of the LAN-WAPs 311 and the corresponding acknowledgement (ACK) received from the corresponding LAN-WAPs 311. Exemplary RTT/RSSI models are described in co-pending patent application "WIRELESS POSITION DETERMINATION USING ADJUSTED ROUND TRIP TIME MEASUREMENTS" by Aggarwal et al. (Ser. No. 12/622,289), which has been incorporated herein by reference.

Angle of Arrival information may be determined using conventional techniques, which may include, for example, exploiting signal phase information, multiple channels and/or signals received and combined from multiple wireless access points to estimate the angle of arrival information associated with the received signal. The angel of arrival information may be utilized to initially isolate the position of a misconfigured wireless access point. For example, angle of arrival information may be used as a "trigger" to indicate whether a LAN-WAP has moved from its previous position.

When determining the position of the mobile station 108, each of the determined distances $d_{o1}$, $d_{o2}$, and $d_{o3}$ may define the radius of a circle. The center of each circle may be defined by the position of each LAN-WAP. The intersection of the circles may provide the location (x, y) of the mobile station 108. As can be seen in FIG. 4, the circle defined by radius $d_{o3}$ and center ($X_{3err}$, $Y_{3err}$) is improperly shifted because of the location error of LAN-WAP3 311c. This shift can reduce the accuracy of the position solution. The calibration techniques described herein can ascertain that LAN-WAP3 is misconfigured, and as will be described below in FIG. 5, may be able to estimate the actual position ($X_{3act}$, $Y_{3act}$) of LAN-WAP3 311c to improve the accuracy of the position determination process used to locate the mobile station 108.

Figure 5:
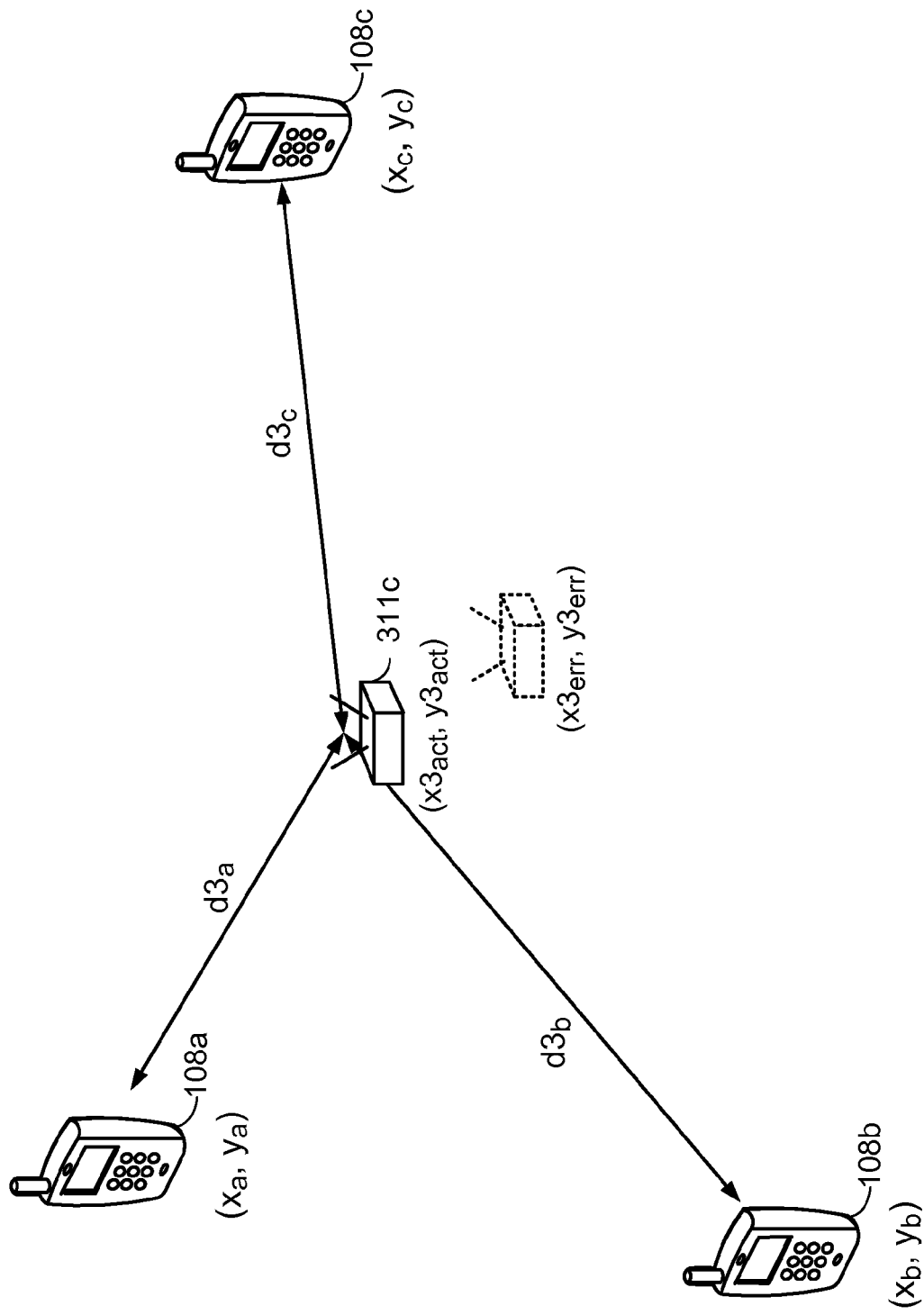
FIG. 5 is a diagram showing an embodiment where a positioning server may estimate the actual position of the misconfigured LAN-WAP using information derived from a plurality of mobile stations.

FIG. 5 is a diagram showing an embodiment where the positioning server 112 may estimate the actual position of the misconfigured LAN-WAP3 311c using information derived from a plurality of mobile stations 108. Each mobile station 108a, 108b, and 108c may provide its position, ($x_a$, $y_a$), ($x_b$, $y_b$), and ($x_c$, $x_c$), respectively, to positioning server 112. In addition, each mobile station 108a-108c may provide measurements (e.g., RTT and/or RSSI) so that the distances ($d3_a$, $d3_b$, $d3_c$, respectively) between each mobile station and the misconfigured LAN-WAP3 311c may be determined. By knowing each distance and the locations of each mobile station 108a-108c, the actual position ($X_{3act}$, $Y_{3act}$) of the misconfigured LAN-WAP3 311c may be determined using known techniques, such as, for example, trilateration.

Because the positions of each mobile station 108a-108c initially provided to the PS 112 may be inaccurate due to using ($X_{3err}$, $Y_{3err}$) in their determination, the PS 112 may iterate upon the actual position ($X_{3act}$, $Y_{3act}$) of LAN-WAP3 311c, where each successive estimate of the LAN-WAP3 311c position may be refined by using updated positions of each mobile station 108a-108c, which are computed using a prior estimate of the actual position ($X_{3act}$, $Y_{3act}$) of LAN-WAP3 311c.

In order to estimate the position of the misconfigured LAN-WAP 311c in three-dimensions, the positioning server 112 should have information from at least three mobile stations.

Figure 6:
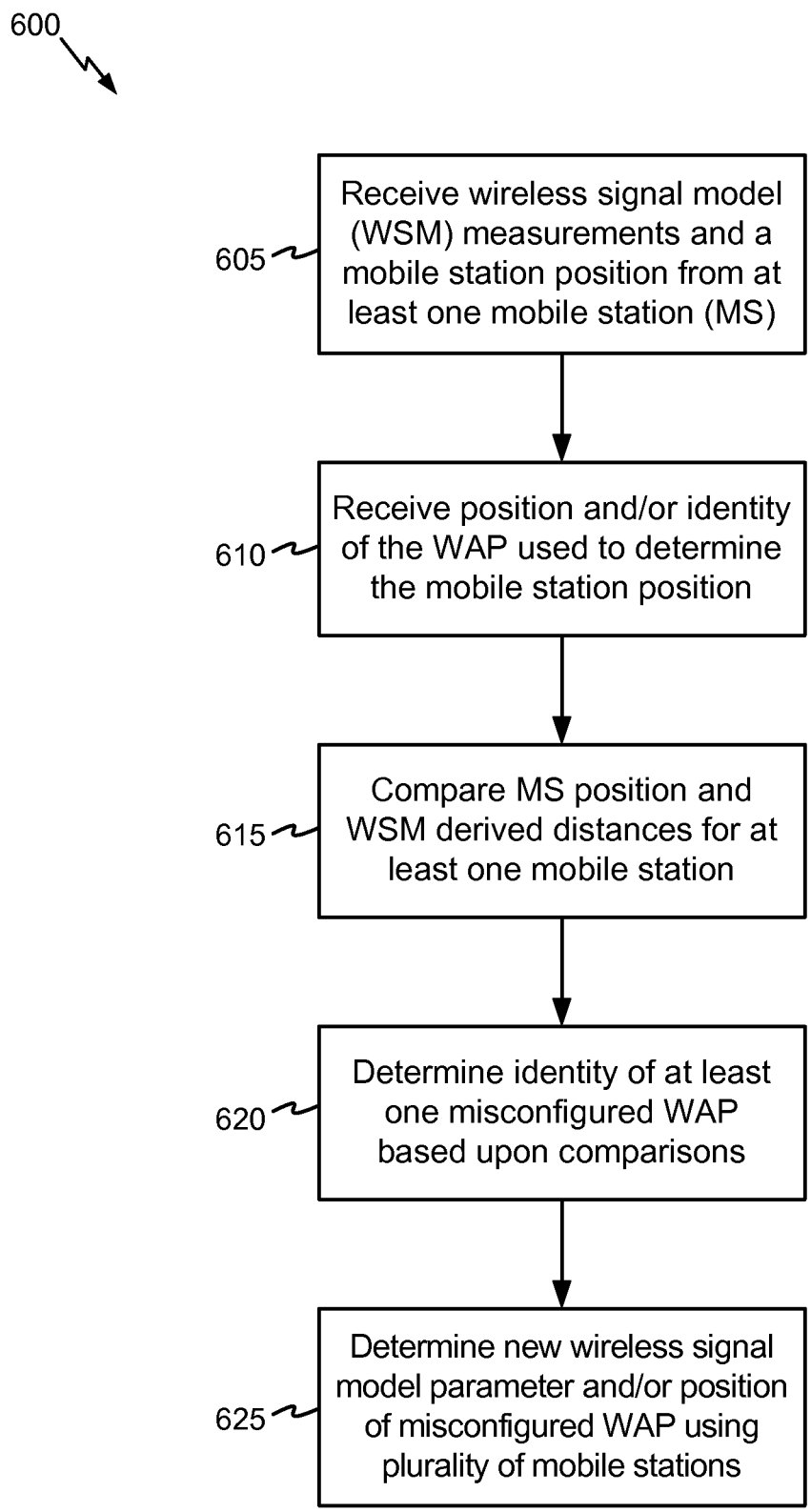
FIG. 6 is a flow chart illustrating an embodiment of a calibration process which may be performed by the positioning server.

FIG. 6 is a flow chart 600 illustrating an embodiment of a calibration process which may be performed by the positioning server (PS) 112. Initially, the PS 112 may receive from at least one mobile station 108 a position estimate thereof, where this position may be determined by the mobile station itself (605). Additionally, the PS 112 may receive wireless signal model measurements from mobile station 108, which are associated with packet exchanges with the WAPs used in the determination of the mobile station's position (605). These measurements may include RTT and/or RSSI measurements and wireless signal model measurements derived from packets exchanged between the at least one mobile station and a plurality of WAPs. In other embodiments, the wireless signal model measurements may include angle of arrival measurements to one or more WAPs.

The PS 112 may further receive, from the mobile station, positions and/or identities of the WAPs which may have been used for determining the position of the mobile station(s) (610). The positions of each WAP may have been reported to the mobile station 108 via a beacon signal. Alternatively, the positions of the WAPs may be determined via a database (e.g., parameter database 224) and/or an annotated map (which may also be stored in a database). The positions associated with the WAPs may be provided by the back end network. Exemplary techniques for providing the mobile station 108 with the positions of the WAPs are described in co-pending patent application "A METHOD AND APPARATUS FOR PROVIDING AND UTILIZING LOCAL MAPS AND ANNOTATIONS IN LOCATION DETERMINATION" by Das et al. (Ser. No. 12/641,225), which has been incorporated herein by reference.

In other embodiments, the identities of each WAP used in the position determination of the mobile station 108 may be used by the mobile station so that their positions may be retrieved from a resident database (e.g., parameter database 340) (610). In further embodiments, this information may also be received, either in whole or in part, from other database(s) functionally coupled to the network. The WAP identities may be standard networking parameters, such as, for example, MAC addresses.

Based upon the received information, the PS 112 may compare the received position of the mobile station(s) 108 with wireless signal model measurements. In one embodiment, this may be accomplished by having the PS 112 determine the distances to each WAP using the wireless signal model measurements and the appropriate wireless signal model (hereinafter referred to as "measured distances"). A corresponding geometric distance between each WAP and mobile station(s) 108 may be computed by the PS 112 using the received positions of the mobile station(s) and each WAP. The PS 112 may compare the computed geometric distance with its corresponding measured distance to detect significant deviations (615). The comparisons may be combined to determine at least one misconfigured wireless access point from the plurality of wireless access points. If the PS 112 finds significant deviations (which may be determined, for example, using thresholding and/or other statistical techniques), the WAP associated with the geometric distances can be identified as a misconfigured wireless access point (620). If information is received from a plurality of mobile stations 108, a wireless signal model parameter and/or a new position of the misconfigured wireless access point based upon the wireless signal model measurements and positions of the plurality of mobile stations may be determined, and misconfigured WAP parameters (such as wireless signal model parameters and/or location) may be corrected (625). These corrections may be performed by combining the information from the plurality of mobile stations 108. For example, as described above in FIG. 5, the position of a LAN-WAP may be calibrated by having the PS 112 perform trilateration using each mobile station position and measured distance to the misconfigured LAN-WAP. In other embodiments, statistical techniques may be used to calibrate timing delays and/or signal strength parameters associated with a misconfigured WAP. The wireless signal model parameter may include time delays and/or signal strength adjustments associated with the misconfigured wireless access point. In other embodiments, the PS 112 may use the information supplied by the mobile stations to detect whether the LAN-WAP was removed from the network. For example, if a number of mobile stations take measurements near a previously determined location for $WAP_k$, and none of these measurements include RSSI/RTT ranging information for $WAP_k$ then it may be likely that $WAP_k$ has moved, or has been disabled.

Figure 7:
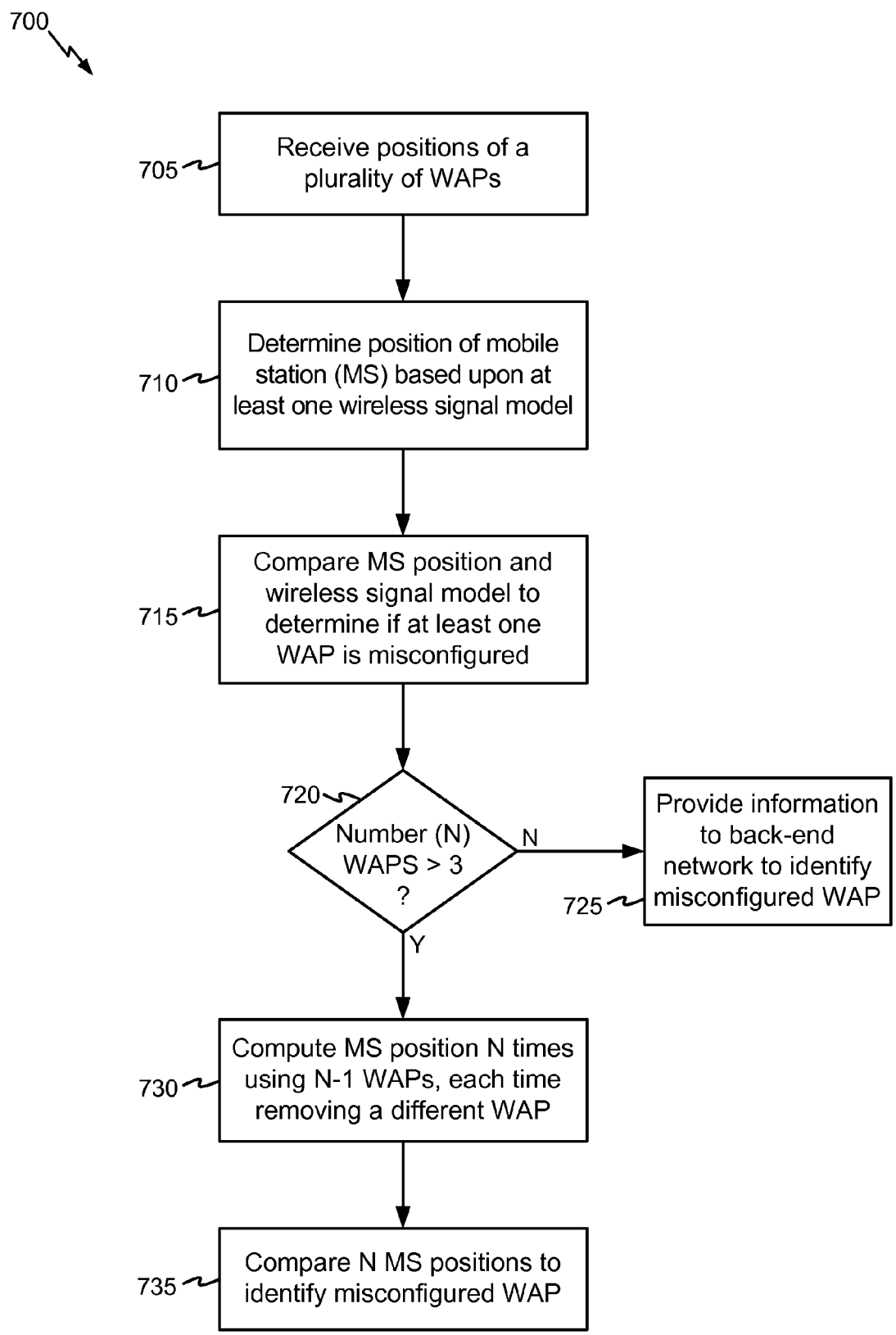
FIG. 7 is a flow chart illustrating an embodiment of a calibration process which may be performed by the mobile station.

FIG. 7 is a flow chart 700 illustrating an embodiment of a calibration process which may be performed by the mobile station 108. This method may be performed in addition to the method described above in FIG. 6. Initially, the method may start by having the mobile station receive positions associated with a plurality of wireless access points (705). This information may be provided as described above in FIG. 6 (e.g. received in beacon signals and/or annotated maps). The mobile station 108 may then determine its own position based upon at least one wireless signal model and associated measurements (710). The mobile station 108 may then compare its position with the wireless signal model(s) to determine if at least one misconfigured WAP is present (715). The comparisons may be combined to determine at least one misconfigured wireless access point from the plurality of wireless access points. The comparison(s) may involve analyzing geometrically derived distances with the distances based upon wireless measurements. The mobile station may then determine whether the number of WAPs involved in ranging is greater than three (720). If so, the mobile station 108 may identify the misconfigured WAP using a process of elimination wherein the mobile station 108 determines its position (e.g., calculate a test position) multiple times, each time removing a different WAP and using the remaining WAPs for position determination. These positions may be compared, and any outlier position of the mobile station 108 may be used to identify the misconfigured WAP (730). If removing a WAP causes the pre-trilateration distance measurements to coincide more closely with the post-trilateration distances, then the WAP is considered a possible candidate for being misconfigured. If this behavior is seen many times, and by many stations, then the likelihood of the AP being misconfigured continues to increase (735).

If number of ranging WAPs is determined to be less than or equal to three in Block 720, then the mobile station 725 may provide appropriate information to the back end network, where the PS 112 may be used to identify the misconfigured WAP (725).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. It will be appreciated that embodiments include various methods for performing the processes, functions and/or algorithms disclosed herein. For example, as illustrated in FIG. 6, an embodiment can include a method for calibrating a misconfigured wireless access point used for determining a position of a mobile station. The method may include receiving a position of at least one mobile station and wireless signal model measurements derived from packets exchanged between the at least one mobile station and a plurality of wireless access points. The method may further include receiving positions and/or identities of the plurality of wireless access points used in determining the position of the at least one mobile station, comparing a position of the at least one mobile station with wireless signal model measurements, and identifying a misconfigured wireless access point based upon the comparing. Another exemplary method is shown in FIG. 7, where a flow chart describing the calibration of a misconfigured wireless access point at a mobile station is illustrated. The method may include receiving positions associated with a plurality of wireless access points, and determining a position of the mobile station based upon a wireless signal model. The method may further include comparing the position of the mobile station and the wireless signal model with the positions associated with the plurality of wireless access points, and determining whether at least one wireless access point is misconfigured.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. A machine may take the form of a computer/processing unit. For example, software codes may be stored in a memory and executed by a processing unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. A computer-readable medium may take the form of an article of manufacture. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for identifying a misconfigured wireless access point used for determining a position of a mobile station, the method comprising:
   receiving a position of at least one mobile station;
   receiving wireless signal model measurements based at least in part on packets exchanged between the at least one mobile station and a plurality of wireless access points;
   determining angles of arrival at the at least one mobile station of signals from the plurality of wireless access points based on packets received from the plurality of wireless access points;
   receiving information associated with the plurality of wireless access points used in determining the position of the at least one mobile station;
   comparing the wireless signal model measurements with expected wireless signal model values to identify differences between the expected wireless signal model values and the received wireless signal model measurements that exceed a predetermined threshold;
   identifying the misconfigured wireless access point based at least in part on the differences between the expected wireless signal model values and the received wireless signal model measurements that exceed the predetermined threshold; and
   isolating a position of the misconfigured wireless access point based at least in part on at least one of the angles of arrival of signals from the plurality of wireless access points.

2. The method according to claim 1, further comprising:
   determining at least one of a wireless signal model parameter and a new position of the misconfigured wireless access point based upon the wireless signal model measurements and positions of a plurality of mobile stations.

3. The method according to claim 2, wherein the wireless signal model parameter includes at least one of time delays and signal strength adjustments associated with the misconfigured wireless access point.

4. The method according to claim 2, further comprising:
   determining whether the misconfigured wireless access point was removed from a network.

5. The method according to claim 1, further comprising:
   determining positions of the plurality of wireless access points from at least one of a database and an annotated map.

6. The method according to claim 1, wherein comparing the position of the at least one mobile station with wireless signal model measurements further comprises:
   computing distances between the at least one mobile station and the plurality of wireless access points;
   comparing the computed distances and distances based upon at least one wireless signal model; and
   combining the comparisons to determine at least one misconfigured wireless access point from the plurality of wireless access points.

7. The method according to claim 1, wherein the wireless signal model measurements include at least one of round trip time (RTT) and received signal strength associated with the exchanged packets.

8. The method of according to claim 1, wherein the information associated with the plurality of wireless access points includes at least one of positions of the plurality of wireless access points and identities of the plurality of wireless access points.

9. An apparatus for identifying a misconfigured wireless access point used for determining a position of a mobile station, comprising:
   a wireless transceiver;
   a processing unit coupled to the wireless transceiver; and
   a memory coupled to the processing unit, wherein the memory stores executable instructions and data for causing the processing unit to:
   receive a position of at least one mobile station and wireless signal model measurements derived from packets exchanged between the at least one mobile station and a plurality of wireless access points;
   determine angles of arrival at the at least one mobile station of signals from the plurality of wireless access points based on packets received from the plurality of wireless access points;
   receive information associated with the plurality of wireless access points used in determining the position of the at least one mobile station,
   compare the wireless signal model measurements with expected wireless signal model values to identify differences between the expected wireless signal model values and the received wireless signal model measurements that exceed a predetermined threshold, identify the misconfigured wireless access point based at least in part on the differences between the expected wireless signal model values and the received wireless signal model measurements that exceed the predetermined threshold, and isolate a position of the misconfigured wireless access point based at least in part on at least one of the angles of arrival of signals from the plurality of wireless access points in at the at least one mobile station.

10. The apparatus according to claim 9, further comprising instructions for causing the processing unit to:

determine at least one of a wireless signal model parameter and a new position of the misconfigured wireless access point based upon the wireless signal model measurements and positions of a plurality of mobile stations.

11. The apparatus according to claim 10, wherein the wireless signal model parameter includes at least one of time delays and signal strength adjustments associated with the misconfigured wireless access point.

12. The apparatus according to claim 10, further comprising instructions for causing the processing unit to:

determine whether the misconfigured wireless access point was removed from a network.

13. The apparatus according to claim 9, further comprising instructions for causing the processing unit to:

determine positions of the plurality of wireless access points from at least one of a database and an annotated map.

14. The apparatus according to claim 9, further comprising instructions for causing the processing unit to:

compute distances between the at least one mobile station and the plurality of wireless access points, compare the computed distances and distances based upon at least one wireless signal model, and combine the comparisons to determine at least one misconfigured wireless access point from the plurality of wireless access points.

15. The apparatus according to claim 9, wherein the wireless signal model measurements include at least one of round trip time (RTT) and received signal strength associated with the exchanged packets.

16. The apparatus according to claim 9, wherein the information associated with the plurality of wireless access points includes at least one of positions of the plurality of wireless access points and identities of the plurality of wireless access points.

17. An apparatus for identifying a misconfigured wireless access point used for determining a position of a mobile station, comprising:

means for receiving a position of at least one mobile station and wireless signal model measurements derived from packets exchanged between the at least one mobile station and a plurality of wireless access points;

means for determining angles of arrival at the at least one mobile station of signals from the plurality of wireless access points based on packets received from the plurality of wireless access points;

means for receiving information associated with the plurality of wireless access points used in determining the position of the at least one mobile station;

means for comparing the wireless signal model measurements with expected wireless signal model values to identify differences between the expected wireless signal model values and the received wireless signal model measurements that exceed a predetermined threshold;

means for identifying the misconfigured wireless access point based at least in part on the differences between the expected wireless signal model values and the received wireless signal model measurements that exceed the predetermined threshold; and means for isolating a position of the misconfigured wireless access point based at least in part on at least one of the angles of arrival of signals from the plurality of wireless access points the at least one mobile station.

18. The apparatus according to claim 17, further comprising:

means for determining at least one of a wireless signal model parameter and a new position of the misconfigured wireless access point based upon the wireless signal model measurements and positions of a plurality of mobile stations.

19. The apparatus according to claim 18, wherein the wireless signal model parameter includes at least one of time delays and signal strength adjustments associated with the misconfigured wireless access point.

20. The apparatus according to claim 18, further comprising means for determining whether the misconfigured wireless access point was removed from a network.

21. The apparatus according to claim 17, further comprising means for determining positions of the plurality of wireless access points from at least one of a database and an annotated map.

22. The apparatus according to claim 17, further comprising:

means for computing distances between the at least one mobile station and the plurality of wireless access points;

means for comparing the computed distances and distances based upon at least one wireless signal model; and means for combining the comparisons to determine at least one misconfigured wireless access point from the plurality of wireless access points.

23. The apparatus according to claim 17, wherein the wireless signal model measurements include at least one of round trip time (RTT) and received signal strength associated with the exchanged packets.

24. The apparatus according to claim 17, wherein the information associated with the plurality of wireless access points includes at least one of positions of the plurality of wireless access points and identities of the plurality of wireless access points.

25. A non-transitory computer-readable medium, having stored thereon computer-readable instructions for identifying a misconfigured wireless access point used for determining a position of a mobile station, comprising instructions configured to cause a computer to:

receive a position of at least one mobile station and wireless signal model measurements derived from packets exchanged between the at least one mobile station and a plurality of wireless access points determine angles of arrival at the at least one mobile station of signals from the plurality of wireless access points based on packets received from the plurality of wireless access points;

receive information associated with the plurality of wireless access points used in determining the position of the at least one mobile station, compare the wireless signal model measurements with expected wireless signal model values to identify differences between the expected wireless signal model values and the received wireless signal model measurements that exceed a predetermined threshold, identify the misconfigured wireless access point based at least in part on the differences between the expected wireless signal model values and the received wireless signal model measurements that exceed the predetermined threshold, and isolate a position of the misconfigured wireless access point based at least in part on at least one of the angles of arrival of signals from the plurality of wireless access points in at the at least one mobile station.

26. The computer-readable medium according to claim 25, further comprising instructions configured to cause the computer to:

determine at least one of a wireless signal model parameter and a new position of the misconfigured wireless access point based upon the wireless signal model measurements and positions of a plurality of mobile stations.

27. The computer-readable medium according to claim 26, wherein the wireless signal model parameter includes at least one of time delays and signal strength adjustments associated with the misconfigured wireless access point.

28. The computer-readable medium according to claim 25, further comprising instructions configured to cause the computer to:

determine whether the misconfigured wireless access point was removed from a network.

29. The computer-readable medium according to claim 25, further comprising instructions configured to cause the computer to:

determine positions of the plurality of wireless access points from at least one of a database and an annotated map.

30. The computer-readable medium according to claim 25, further comprising instructions configured to cause the computer to:

compute distances between the at least one mobile station and the plurality of wireless access points;

compare the computed distances and distances based upon at least one wireless signal model; and combine the comparisons to determine at least one misconfigured wireless access point from the plurality of wireless access points.

31. The computer-readable medium according to claim 25, wherein the wireless signal model measurements include at least one of round trip time (RTT) and received signal strength associated with the exchanged packets.

32. The computer-readable medium according to claim 25, wherein the information associated with the plurality of wireless access points includes at least one of positions of the plurality of wireless access points and identities of the plurality of wireless access points.

* * * * *